(12) United States Patent
Shimomura

(10) Patent No.: US 7,848,854 B2
(45) Date of Patent: Dec. 7, 2010

(54) PRIME MOVER OUTPUT CONTROL SYSTEM

(75) Inventor: Masaru Shimomura, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 784 days.

(21) Appl. No.: 11/476,055

(22) Filed: Jun. 28, 2006

(65) Prior Publication Data

US 2007/0057513 A1    Mar. 15, 2007

(30) Foreign Application Priority Data

Sep. 13, 2005    (JP)    ............... 2005-265061

(51) Int. Cl.
G06F 19/00    (2006.01)

(52) U.S. Cl. .......................... 700/287; 29/52

(58) Field of Classification Search ................... 290/52, 290/44, 40; 322/29; 318/21, 661, 44; 180/65.1, 180/65.2, 307, 305; 700/169, 170, 174
See application file for complete search history.

(56) References Cited

U.S. PATENT DOCUMENTS

| | | | | |
|---|---|---|---|---|
| 2,225,883 | A | * | 12/1940 | Palmer ......................... 73/522 |
| 3,578,871 | A | * | 5/1971 | Sakamoto ...................... 415/10 |
| 3,586,457 | A | * | 6/1971 | Geary ........................... 415/36 |
| 3,794,846 | A | * | 2/1974 | Schlicher et al. ............... 307/87 |
| 3,802,188 | A | * | 4/1974 | Barrett ........................... 60/664 |
| 4,185,203 | A | * | 1/1980 | Takeuchi .................. 290/40 C |
| 5,789,822 | A | * | 8/1998 | Calistrat et al. ........... 290/40 A |
| 7,095,132 | B2 | * | 8/2006 | Kikuchi et al. ................ 290/52 |

(Continued)

FOREIGN PATENT DOCUMENTS

JP    8-266095    10/1996

(Continued)

OTHER PUBLICATIONS

Office Action dated Feb. 9, 2010 issued in a corresponding Japanese application and English-language translation, 7 pps.

*Primary Examiner*—Kidest Bahta
(74) *Attorney, Agent, or Firm*—Buchanan Ingersoll & Rooney PC

(57) ABSTRACT

A prime mover control system is provided that can prevent magnification of power fluctuation, included in a feedback signal, that occurs between a generator and a power system, and that enables stable operation of the prime mover to continue, without disturbing the power system. In the case where a deviation detection device (1a) that receives as input an output-power command value signal indicating a command value that is a target for the output power of a generator driven by a prime mover and an output-power signal indicating the present value of the output power, and that outputs a deviation signal indicating the deviation between the command value and the present value of the output power, and in the case where a control device (3a) that receives as an input the deviation signal and outputs a control output signal for controlling the output of the prime mover, a filtering device (2a) is provided that, in the output-power signal, the deviation signal, or the control output signal, attenuates or eliminates predetermined frequency components caused by periodic fluctuations, in the output power of a generator, that occur due to discrepancy between the output of the prime mover and the generator output power.

30 Claims, 15 Drawing Sheets

U.S. PATENT DOCUMENTS

2004/0008010 A1* 1/2004 Ebrahim et al. ............... 322/44
2006/0260851 A1* 11/2006 Taue et al. ................. 180/65.1

FOREIGN PATENT DOCUMENTS

| | | |
|---|---|---|
| JP | 09-215394 | 8/1997 |
| JP | 2000-092896 | 3/2000 |
| JP | 2001-178196 | 6/2001 |
| JP | 2002-233195 | 8/2002 |
| JP | 2004-190631 | 7/2004 |

* cited by examiner

PRIME MOVER OUTPUT CONTROL SYSTEM

BACKGROUND OF THE INVENTION

1. Field of the Invention

The present invention relates to a prime mover output control system for a power-generating system in which, by means of a prime mover such as a water turbine, a steam turbine, a gas turbine, or an engine, a generator is rotated to generate electric power.

2. Description of the Related Art

In a conventional control system for prime mover output (mechanical) torque, there has been a problem in that, because a rotating speed detection signal includes white noise, such as sensor noise, and colored noise due to precession movement of a generator, whereby a signal is always outputted, a control system for prime mover output (mechanical) torque operates; therefore, in order to eliminate these types of noise, limitation of output, a dead band, and a band-pass filter are provided (e.g., Japanese Laid-Open Patent Publication No. 2002-233195, Paragraphs 0017 through 0025, FIG. 1).

In addition, there has been a conventional control system (e.g., Japanese Laid-Open Patent Publication No. 1996-266095, Paragraphs 0021 through 0028, FIG. 1) in which a dead-time function receives the deviation between a generator-output command signal and a generator-output signal, determines hunting status, and adds up a difference signal and the output of the dead-time function so as to make a control signal zero.

SUMMARY OF THE INVENTION

Because conventional prime mover control systems have been configured as described above, it has been possible to eliminate noise included in a rotating-speed detection signal and to prevent excessive fluctuations; however, the conventional prime mover control systems directly respond to power fluctuation components, other than those due to noise, that occur between a generator and a power system, thereby controlling the increase or decrease in prime mover output torque, there has been a case where, depending on a timing when the prime mover output torque fluctuates, the fluctuation is magnified rather than suppressed. Moreover, in a method in which a dead-time function is provided, there has been a problem in that, because actual hunting attenuates or increases its amplitude, thereby causing a difference between a past deviation outputted from the dead-time function and the present deviation, the control signal is not zero, whereby the hunting of the generator output can not be avoided due to the difference.

The present invention has been implemented in order to solve the foregoing problems; it is an object to provide a prime mover control system that can prevent magnification of power fluctuation, included in a feedback signal, that occurs between a generator and a power system, and that enables stable operation to continue, without disturbing the power system.

The present invention provides a prime mover output control system in which, in the case where a deviation detection device that receives as input an output-power command value signal indicating a command value that is a target for the output power of a generator driven by a prime mover and an output power signal indicating the present value of the output power, and that outputs a deviation signal indicating the deviation between the command value and the present value of the output power, and in the case where a control device that receives as an input the deviation signal and outputs a control output signal for controlling the output of the prime mover, a filtering device is incorporated that, in the output power signal, the deviation signal, or the control output signal, attenuates or eliminates predetermined frequency components caused by periodic fluctuations, in the output power of a generator, that occur due to discrepancy between the output of the prime mover and the generator output power.

Fluctuation components, in the output power of a generator, that do not require control of a prime mover, and if unnecessarily controlled, rather deteriorates stability of the power system, are attenuated or eliminated by means of a filtering device; therefore, it is possible to prevent the output of the prime mover from unnecessarily responding to fluctuations in output power of the generator, thereby magnifying the fluctuation in the output power.

DETAILED DESCRIPTION OF THE PREFERRED EMBODIMENTS

Embodiment 1

Figure 1:
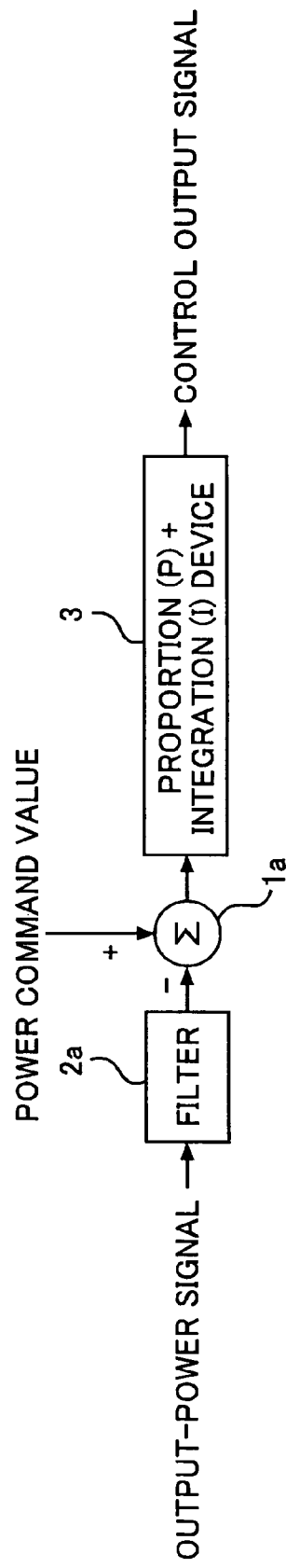
FIG. 1 is a block diagram illustrating a control method for a prime mover control system of a power-generating system, according to Embodiment 1 of the present invention.

FIG. 1 is a block diagram illustrating a control method for a prime mover control system, of a power-generating system, according to Embodiment 1 of the present invention. In FIG. 1, an electric-power command value, which is forwarded in accordance with a demand/supply plan to the power-generating system and is a command value as a target for output power, is inputted to a difference detection device 1a; an output-power signal, which is utilized as a feedback signal and indicates the present value of output power of a generator (unillustrated), is also inputted by way of a filtering device 2a to the deviation detection device 1a. The deviation detection device 1a obtains the difference between the electric-power command value and the filtered output-power signal and outputs a difference signal. Based on the difference signal outputted by the deviation detection device 1a, a PI circuit 3, which is an example of a control device for adjusting responsiveness and stability of a control system and implements proportion/integration control, outputs a control output signal for adjusting output of a prime mover. In the case of a water turbine, the control output signal is forwarded to a control system for opening a guide-vane; in the case of a steam turbine, to a boiler control system or to a control system for opening a steam adjusting valve; and in the case of a gas turbine, to a prime mover output adjusting unit such as a combustion control system.

The filtering device 2a is configured of a filter for, through an average-value computation during a specific time period, attenuating or eliminating fluctuating components that are not required to be responded to, a low-pass filter for transmitting low-frequency components (attenuating or eliminating high-frequency components), a notch filter for attenuating or eliminating a specific frequency components, and the like.

Next, the operation of the prime mover control system, of a generator, according to Embodiment 1 of the present invention will be explained.

Figure 2:
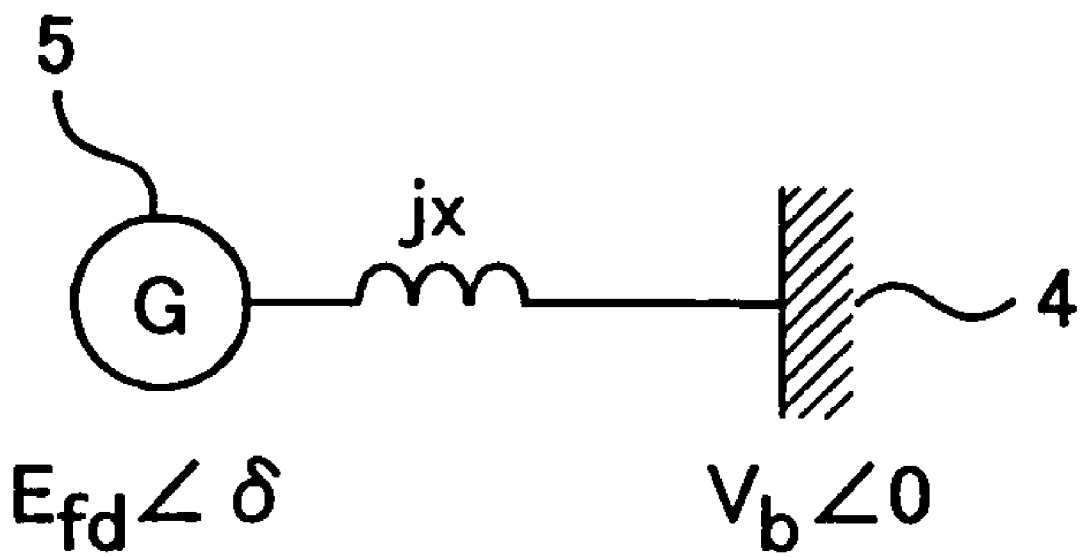
FIG. 2 is a diagram illustrating a model for a single machine infinite bus system.

With regard to a single machine infinite bus system briefly illustrated in FIG. 2, the output power $P_e$ in the case where a generator is connected with a power system is given by Equation 1:

$$P_e = \frac{E_{fd} \cdot V_b}{X} \sin \delta \qquad \text{Eq. 1}$$

In addition, in FIG. 2, Reference characters $E_{fd}$, $V_b$, X, and $\delta$ denote a voltage behind transient reactance, the voltage on an infinite bus 4, reactance between a generator 5 and the infinite bus 4, and the phase angle of the generator 5, respectively.

Figure 3:
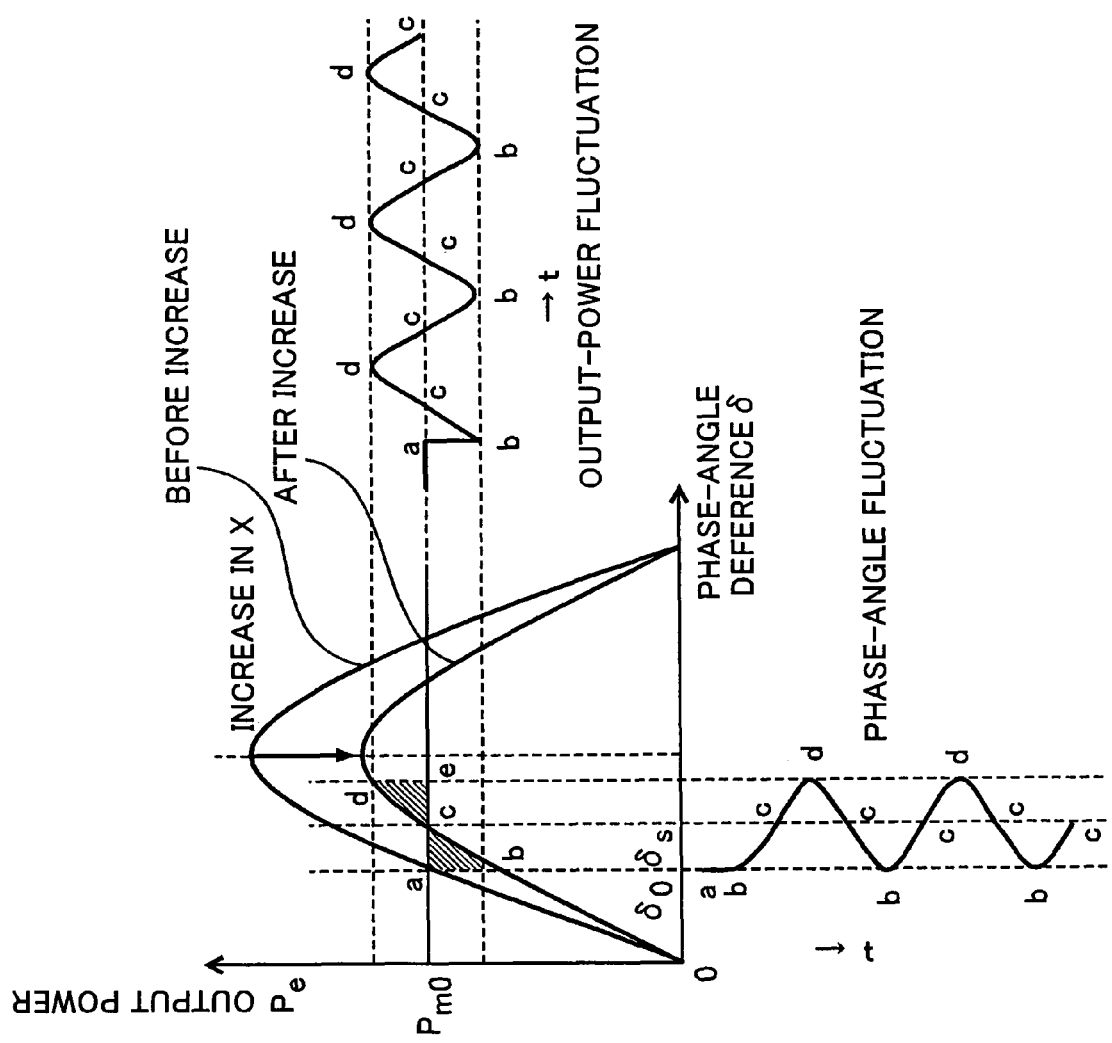
FIG. 3 is a set of charts representing behavior of the power fluctuation between a generator and a power system.

FIG. 3 is a set of charts representing the behavior of power fluctuation between the generator and the power system; in FIG. 3, a characteristic chart in which, with the abscissa indicating the phase angle $\delta$ and the ordinate indicating the output power $P_e$, the output power $P_e$ in Equation 1 is represented, and behavior charts representing the behavior in the case of change in the output of a prime mover that drives the generator are added.

The characteristic chart consists of two p—$\delta$ curves that, in the case where, due to opening of one line, or the like, the reactance X of the power transmission line increases, represent a before-change characteristic and an after-change characteristic, of the output power; the temporal fluctuation in the output power $P_e$, in the case where, due to the change, the output of the prime mover changes, is represented at the right-hand side of the characteristic chart, and the temporal fluctuation in the phase angle $\delta$ is represented below the characteristic chart.

In the steady state, the generator is operated at a cross point a between a line representing an output $P_{m0}$ of the prime mover and the characteristic curve representing the output power $P_e$ of the generator, i.e., at the phase angle of $\delta_0$.

In the case where, due to opening of one line, or the like, the reactance X of the power transmission line increases, the output power of the generator changes, thereby causing the following fluctuation:

(1) The operating point changes from Point a to Point b. In this case, the output power $P_e$ changes; however, the phase angle $\delta$ does not change.

(2) Because the $P_e$ becomes smaller than the output $P_{m0}$ of the prime mover, the generator is accelerated. The generator is accelerated in such a way as to exceed Point c where the output power $P_e$ coincides with the output $P_{m0}$ of the prime mover. In the case where a rotational loss in the generator and a resistance loss can be neglected, the generator is accelerated to Point d where the areas of triangles $\Delta abc$ and $\Delta cde$ are equal.

(3) When reaching Point d, the output power $P_e$ is larger than the output $P_{m0}$ of the prime mover, whereby the generator is decelerated. In the case where the losses are zero, the generator is decelerated Point b.

(4) If the losses are zero, the fluctuation from Point b to Point d, of the output power $P_e$, continues; however, in effect, there are various kinds of losses that act in such a way as to suppress the fluctuation of the output power $P_e$; therefore, the output power $P_e$ eventually converges on Point c ($P_e = P_{m0}$, $\delta = \delta_s$). In addition, the fluctuation period of the output power $P_e$ is determined by synchronizing torque that is determined by the characteristics of a power system and a generator, and by the total inertial constant of the rotating part of the generator, the prime mover and so on.

Meanwhile, because the prime mover control system that implements control in such a way that the deviation between the electric-power command value and the output power $P_e$ becomes zero operates so as to suppress the fluctuation of the output power $P_e$, the output of prime mover changes.

The change in the output of the prime mover depends on the characteristics of the prime mover; if, in the case (1) where the operating point changes to Point b, the output of the prime mover increases, the area of the triangle $\Delta abc$, i.e., the acceleration energy is magnified, whereby the change is accelerated until the output power $P_e$ exceeds Point d that is a transient point in the case where the output of the prime mover does not change.

Next, if, in the case (3) where the operating point changes to Point d, the output of the prime mover decreases, the area of the triangle $\Delta cde$, i.e., the deceleration energy is magnified, whereby the generator is decelerated until the output power $P_e$ becomes smaller than Point b that is a transient point in the case where the output of the prime mover does not change. The repetition of the foregoing operation magnifies the oscillation of the change.

In Embodiment 1, as described above, after fluctuation components, in the output power of a generator, that does not require control by a prime mover and, if unnecessarily controlled, rather deteriorates stability are attenuated or eliminated, by making the output-power signal from the generator pass through the filtering device 2a, the deviation between a electric-power command value and a generator-output value is obtained in the deviation detection device 1a; therefore, unnecessary fluctuation components are attenuated in or eliminated from the control output signal based on a deviation signal outputted from the deviation detection device 1a. Accordingly, the output of a prime mover is prevented from unnecessarily responding to the fluctuation in the output power of a generator, thereby magnifying the power fluctuation.

In addition, with regard to adjustment of components to be eliminated by the filtering device 2a, in addition to the method implemented based on the fact that the frequency of the fluctuation components is determined, as described above, by synchronizing torque and the inertial constant of a rotating part, a method, e.g., adjustment of an actual apparatus, with conditions being varied, is conceivable.

Heretofore, the local-mode components in a single machine infinite bus system model has been explained; the fluctuation components, which may be caused by the configuration and operation, of a power system, and by the constants of a generator, and which does not require control by a prime mover and, if unnecessarily controlled, rather deteriorates stability, also include other components, such as generator-to-generator-mode components, power system-to-power system-mode components, that occur in a multiple machine system; however, those other components can also be attenuated or eliminated by the filtering device 2a.

Moreover, in FIG. 1, an example is illustrated in which the filtering device 2a is arranged before the deviation detection device 1a. The configuration as described above demonstrates the following advantages: however, wherever after the deviation detection device 1a (including the prime mover) the filtering device 2a is arranged, the same effect of suppressing fluctuation can be obtained.

(1) Unnecessary response in stages after the deviation detection device 1a can be avoided.

(2) Errors and nonlinearization that are caused by a limiter or through saturation can be prevented.

(3) In the case of control-mode switching, switching through the deviation signal is easy.

Embodiment 2

In Embodiment 1, a method has been described in which the magnification of power fluctuation is prevented by attenuating or eliminating fluctuation components that does not require response; however, in Embodiment 2, a control method will be described in which the unnecessary fluctuation is positively suppressed.

Figure 4:
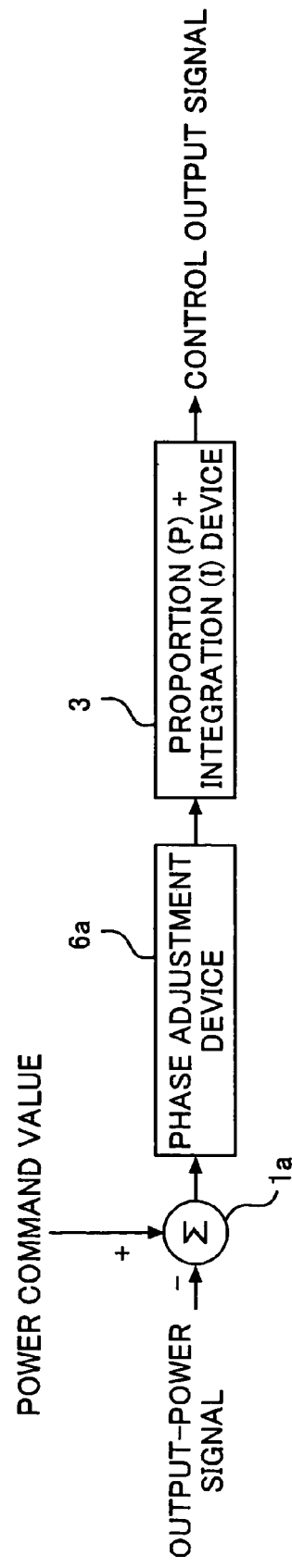
FIG. 4 is a block diagram illustrating a control method for a prime mover control system according to Embodiment 2 of the present invention.

FIG. 4 is a block diagram illustrating a control method for a prime mover control system according to Embodiment 2 of the present invention. In FIG. 4, in place of the filtering device 2a in FIG. 1, a phase adjustment device 6a configured of a lag-lead network $(1+T_1 \cdot s)/(1+T_2 \cdot s)$ and the like is arranged before the PI circuit 3. The adjustment of the phase is similar to that in Embodiment 1, and eventually implemented on the basis of an actual apparatus.

In the phase adjustment device 6a, by changing increase and decrease, in the output of the prime mover, for the fluctuation of the output power $P_e$ of the generator in such a way as to occur at the following timing, thereby making the following behavior to be repeated, the oscillation of the change can be converged:

(1) When the output power Pe changes to Point b, the output of the prime mover is reduced. The area of $\Delta abc$, i.e., the acceleration energy becomes small, whereby the output power $P_e$ is not accelerated up to as high as Point d that is a transient point in the case where the output of the prime mover does not change.

(2) Next, the output at Point d, of the prime mover, is increased. The area of $\Delta cde$, i.e., the deceleration energy becomes small, whereby the output power $P_e$ is not decelerated down to as low as Point b that is a transient point in the case where the output of the prime mover does not change.

In addition, in FIG. 4, an example has been illustrated in which the phase adjustment device 6a is arranged between the deviation detection device 1a and the PI circuit 3; however, also in the case where, as is the case with Embodiment 1, the phase adjustment device 6a is provided in the deviation detection device 1a and receives the output-power signal, or in the case where the phase adjustment device 6a is provided after the PI circuit 3, the same effect is demonstrated.

Moreover, even when the characteristics of the prime mover, which includes a servo system to which the control output signal is outputted and the output-power adjusting unit for implementing output-power adjustment such as combustion control, changes depending on an operational condition, the change in the characteristics of the prime mover can be coped with, by providing multiple phase adjustment device 6a and switching them, depending on an operational condition, or by adding a changing device for changing the constant of the phase adjustment device 6a, depending on an operational condition.

Embodiment 3

In Embodiment 2, a method has been described in which, in order to adjust the timing at which the output of the prime mover is increased or decreased, the phase adjustment device 6a is arranged in series with a control device; however, in Embodiment 3, a method will be described in which, by adding a circuit that responds only to fluctuation components in the output power of the generator, thereby positively increasing or decreasing the output of the prime mover, the fluctuation in the output power of the generator is suppressed.

Figure 5:
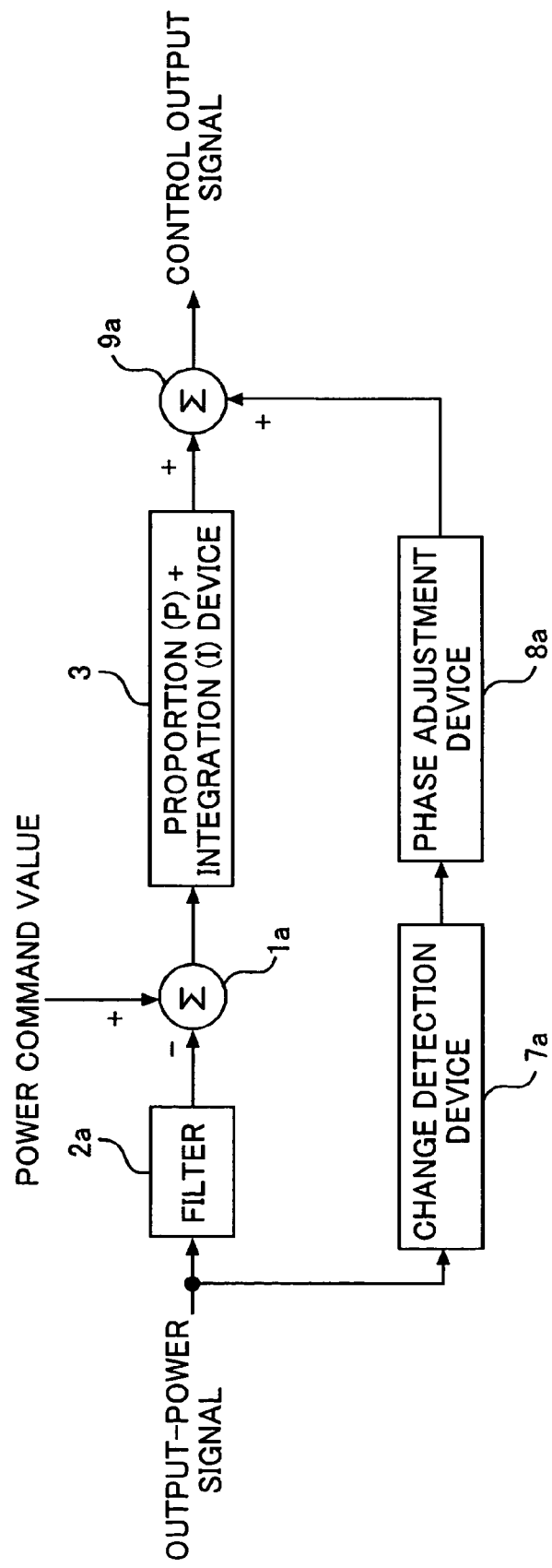
FIG. 5 is a block diagram illustrating a control method for a prime mover control system according to Embodiment 3 of the present invention.

FIG. 5 is a block diagram illustrating a control method for a prime mover control system according to Embodiment 3 of the present invention. The configuration in FIG. 5 is obtained by, to the configuration in FIG. 1, adding a change detection device 7a for detecting changing components in the output-power signal, a phase adjustment device 8a, and a addition device 9a for adding up the output of the PI circuit 3 and the output of the phase adjustment device 8a and creating the control output signal.

The change detection device 7a is configured of a differentiation circuit for extracting only fluctuation components, a band-pass filter circuit for transmitting only a component having a predetermined fluctuation frequency, and the like; the phase adjustment device 8a is configured of the lag-lead network $(1+T_1 \cdot s)/(1+T_2 \cdot s)$ and the like, as is the case with the phase adjustment device 6a. The adjustment of the phase is implemented in the same manner as that in Embodiment 2.

In the configuration in FIG. 5, in the case where the output power of the generator fluctuates, a signal corresponding to the fluctuation components only is extracted by the change detection device 7a, the phase of the signal is adjusted by the phase adjustment device 8a in such a way that the output of the prime mover increases or decreases at the same timing for suppressing the fluctuation as described in Embodiment 2, and the signal as the control output signal increases or decreases the output of the prime mover, through the addition device 9a; therefore, as is the case with Embodiment 2, the fluctuation in the output power of the generator can be suppressed.

Moreover, in Embodiment 3, as a configuration in which a separate circuit is added that responds only to fluctuation components of the output-power signal, a control system is employed in which ordinary power control and fluctuation control can separately be implemented; therefore, each function can be adjusted to an optimal condition.

In addition, in FIG. 5, a configuration has been illustrated in which the filtering device 2a is provided that separates power control in response to the electric-power command value from fluctuation-component suppression control; however, by, in place of the filtering device 2a, adding the change detection device 7a and the phase adjustment device 8a and adjusting the phase adjustment device 8a, the same effect can be obtained.

Similarly, by, to a method in which, as described in Embodiment 2, the phase adjustment device 6a is provided for implementing power control in response to the electric-power command value, adding the change detection device 7a and the phase adjustment device 8a and adjusting the phase adjustment devices 6a and 8a, the same effect can be obtained.

In addition, it should be understood that, by forwarding the output of the phase adjustment device 8a directly to the servo system and the prime mover output adjusting unit for combustion control or the like, to which the control output signal is outputted, the same effect can be obtained.

Embodiment 4

Letting Tm, Te, M. and Δω denote the output torque of a prime mover, the output torque of a generator, the inertial constant of a rotating part, the rotating-speed deviation, respectively, these factors are in the following relationship: In addition, Reference Character s denotes a Laplace operator.

$$\Delta\omega = (T_m - T_e) \cdot \frac{1}{M \cdot s} \quad \text{Eq. 2}$$

Figure 6:
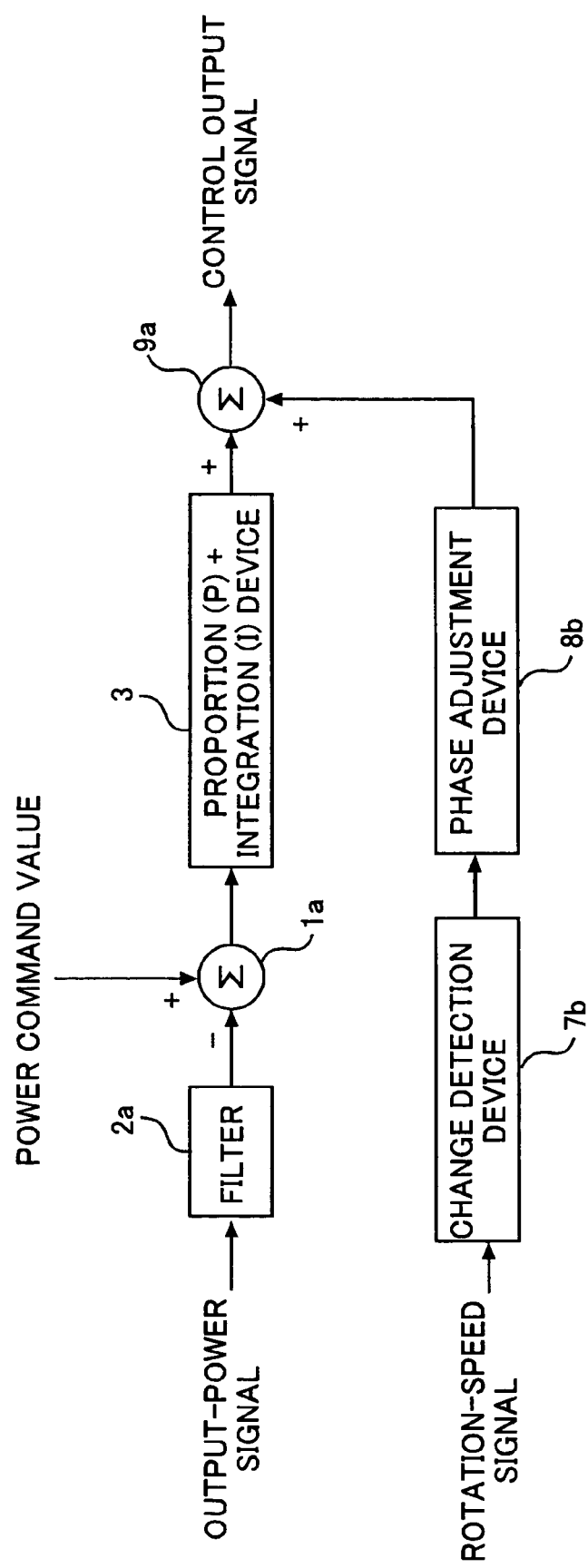
FIG. 6 is a block diagram illustrating a control method for a prime mover control system according to Embodiment 4 of the present invention.

In Embodiment 3, a method has been described in which the output-power signal, from the generator, that is utilized for controlling the output of the prime mover is added by the addition device 9a, by way of the change detection device 7a and the phase adjustment device 8a; however, because the relationship among the rotating-speed ω, the output torque of a prime mover, and the output torque of a generator is given by Equation 2, the same effect can be obtained, by, as illustrated in FIG. 6, adding the rotating-speed ω, by way of the change detection device 7b and the phase adjustment device 8b.

Embodiment 5

Embodiments 1 through 3 relate to electric-power control in which the output power of a generator is controlled to be the electric-power command value as a target; however, with regard to the control of the prime mover, a rotating-speed control function is also provided in which the output of the prime mover is increased or decreased in response to the change in the rotating-speed. Embodiment 5 relates to the control of the rotating-speed of the prime mover.

Figure 7:
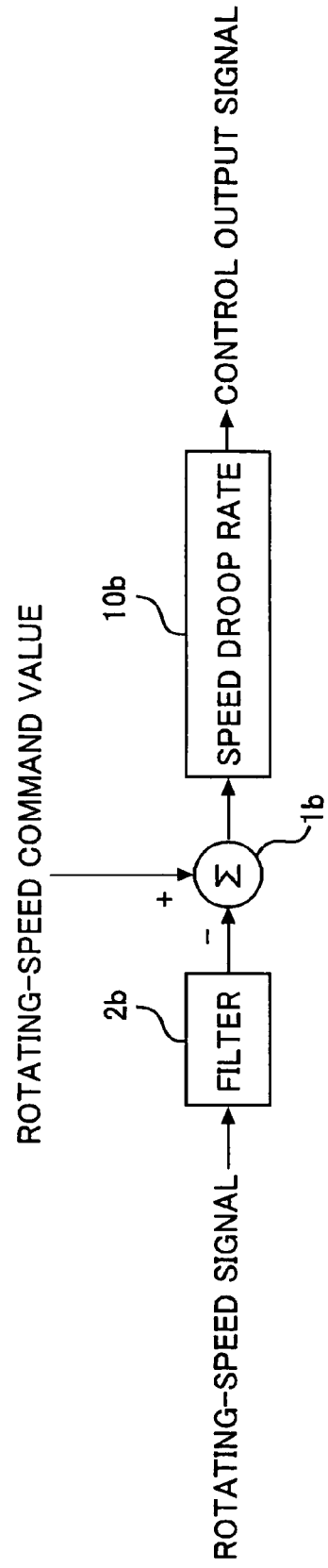
FIG. 7 is a block diagram illustrating a control method for a prime mover control system according to Embodiment 5 of the present invention.
Figure 8:
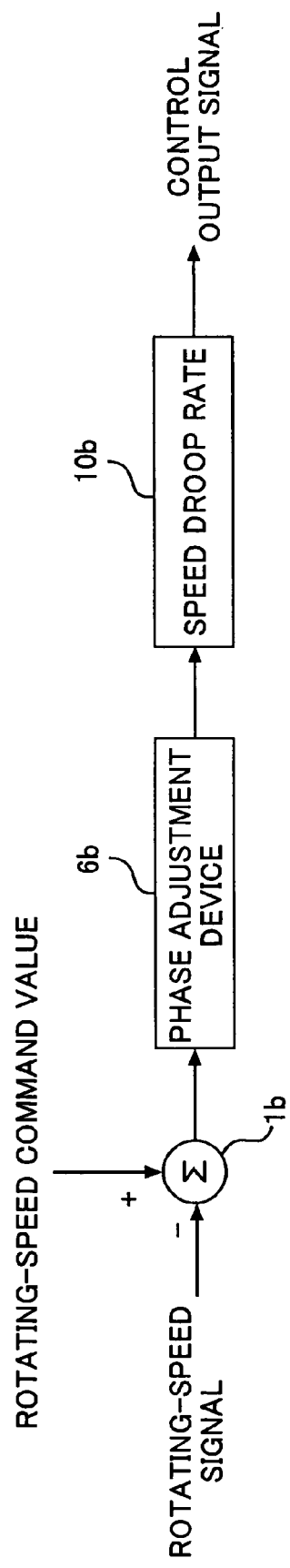
FIG. 8 is a block diagram illustrating a control method for a prime mover control system according to Embodiment 5 of the present invention.
Figure 9:
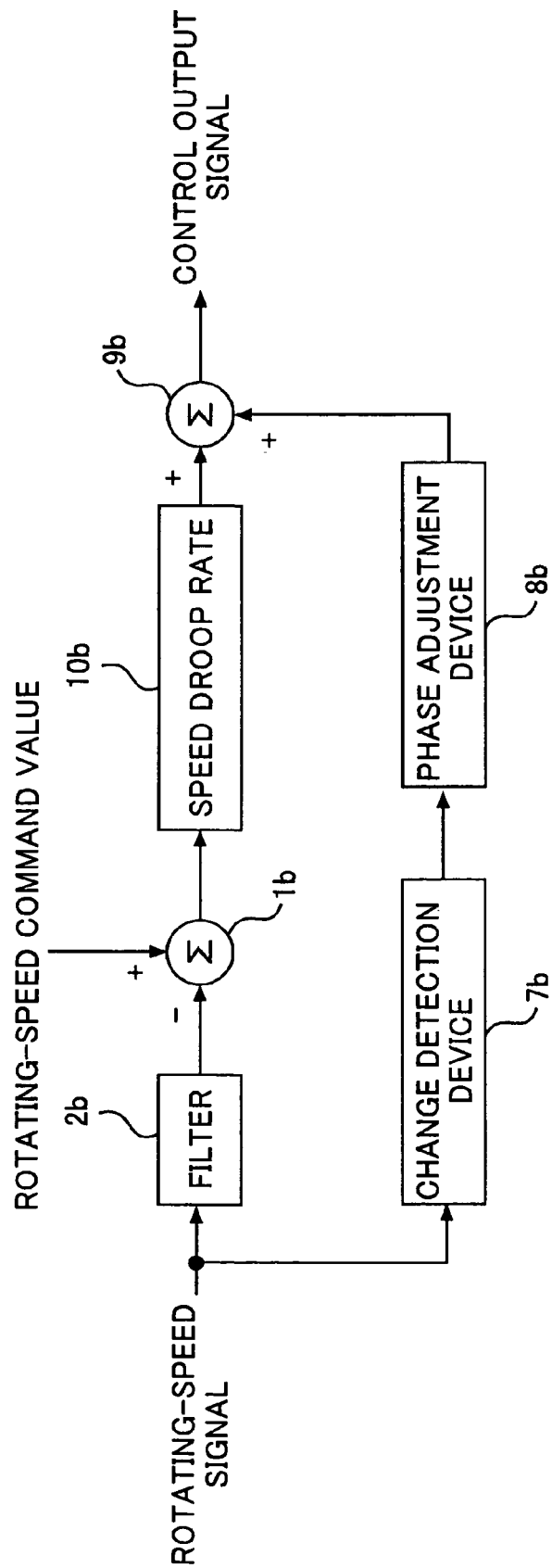
FIG. 9 is a block diagram illustrating a control method for a prime mover control system according to Embodiment 5 of the present invention.

FIGS. 7 through 9 illustrate configuration examples of Embodiment 5; with regard to the configurations illustrated in FIGS. 1, 4, and 5, the electric-power command value, the output power, of the generator, that is a feedback signal, the PI circuit 3 as a control device are replaced by a rotating-speed command value (normally, a rated rotating-speed), a rotating-speed signal, and a speed drop rate 10b, respectively. In addition, the rotating-speed signal is detected through a gear or the like mounted on the shaft of the prime mover; the speed drop rate 10b is a ratio of the amount of change in the output of the prime mover to the change in the rotating-speed.

By being accelerated or decelerated in accordance with the difference between the output of the prime mover and the output power of the generator, the rotating-speed of the prime mover changes. Therefore, when fluctuation in the output power of the generator occurs, the rotating-speed signal fluctuates, and the control output signal changes in accordance with the speed drop rate 10b, whereby the output of the prime mover is changed. Also in rotating-speed control, depending on the timing at which the output of the prime mover fluctuates, magnification of the fluctuation in the output power of the generator is caused by the same action as that described in Embodiment 1.

In consequence, by configuring the control systems as illustrated in FIGS. 7 through 9, the same effect as that in electric-power control can be demonstrated also in rotating-speed control, through actions similar to those in Embodiments 1 through 3.

Figure 10:
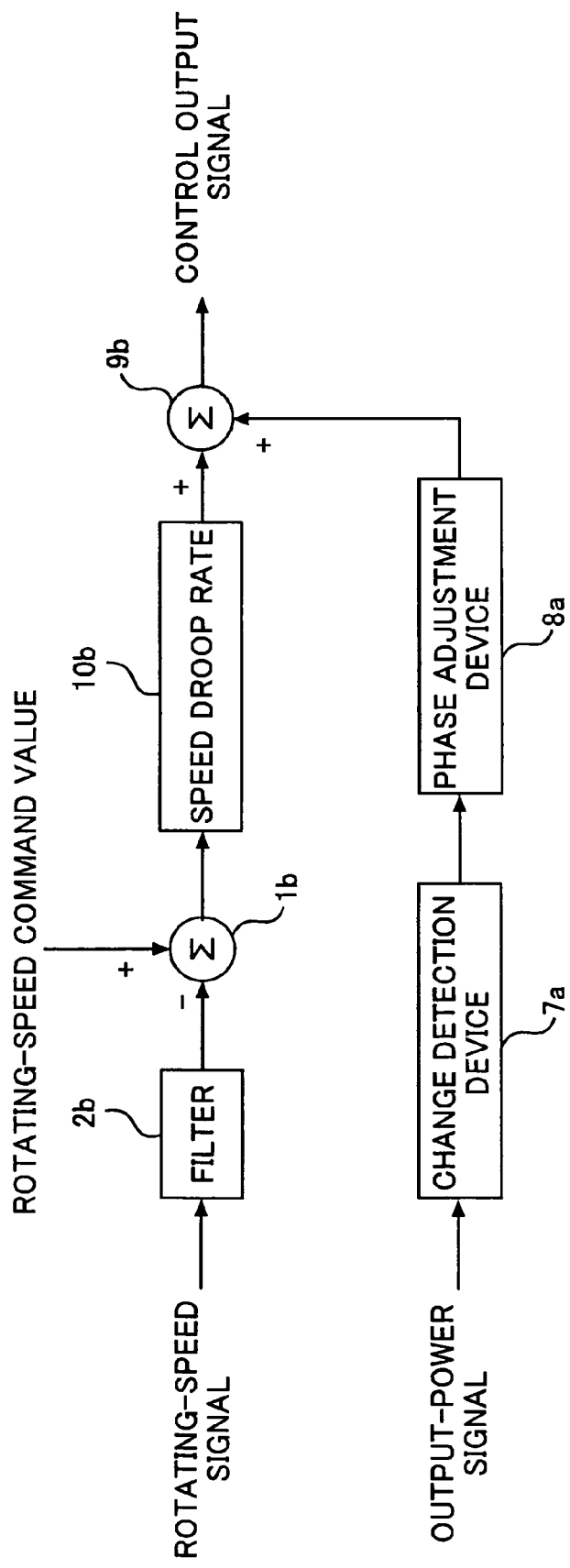
FIG. 10 is a block diagram illustrating a control method for a prime mover control system according to Embodiment 5 of the present invention.

In addition, in the configuration in FIG. 9, a method has been described in which the rotating-speed signal utilized for rotating-speed control is added to the addition device 9b, by way of the change detection device 7b and the phase adjustment device 8b; however, because the relationship between the rotating-speed and the output power of a generator is given by Equation 2, the same effect can be obtained, by, as illustrated in FIG. 10, configuring the control system in which the output power of the generator is added, by way of the change detection device 7a and the phase adjustment device 8a.

Embodiment 6

Figure 11:
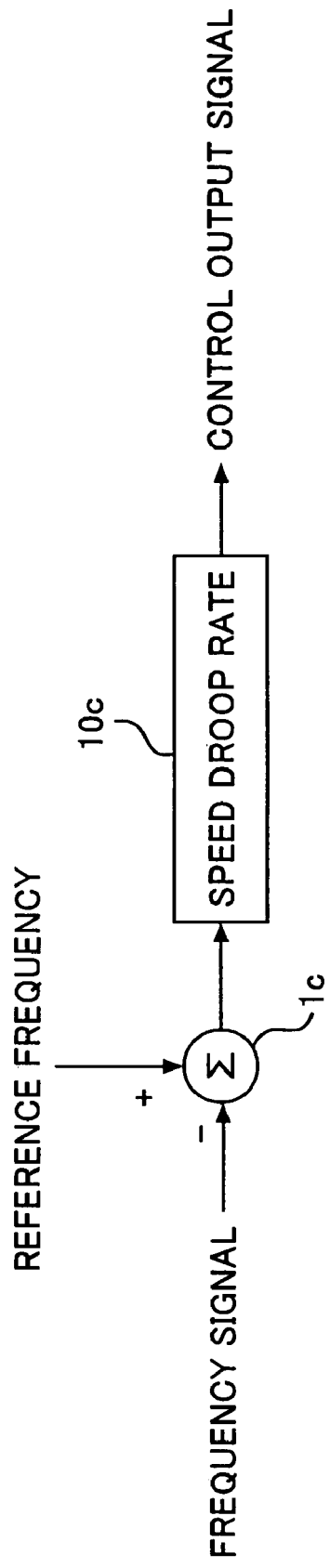
FIG. 11 is a block diagram illustrating a control method for a prime mover control system according to Embodiment 6 of the present invention.

FIG. 11 illustrates a configuration example of Embodiment 6. In the deviation detection device 1c in FIG. 11, the deviation between the reference frequency (normally, 50 Hz or 60 Hz) and a frequency signal, as a feedback signal, at an electric-generator terminal or at the power-system side is obtained, converted in accordance with the speed drop rate 10c into a controlling variable, and outputted as the control output signal. By forwarding the control output signal to the prime mover output adjusting unit, frequency fluctuation at the electric-generator terminal or at the power-system side is suppressed.

In general, because, in prime movers, respective rotating-speed detectors are provided that accurately detect the rotating-speed in order to control the prime mover rotating-speed, the prime mover rotating-speed is utilized as a feedback signal for rotating-speed control. The relationship between the rotating-speed (angular velocity ω=2πf, f is frequency) and the phase angle δ is given by ω=dδ/dt; considering the single machine infinite bus system illustrated in FIG. 2, change in the phase angle δ, i.e., change in the frequency, at infinitive point, is zero. The relationship can be illustrated as in FIG. 12; the closer to the infinitive point the subject point is, the smaller the frequency change becomes. In general, because the inner reactance of a generator is large, the generator terminal is considered an approximately infinitive point and the frequency change becomes small. In contrast, in the case of an independent power system that is separated from a large-scale power system, the system frequency is determined by the demand/supply condition within the independent power system; the system frequency is approximately equivalent to the rotating-speed of the prime mover.

When a generator is connected with the power system, it is an object of rotating-speed control that, when the frequency changes due to a change in the demand/supply condition in the entire power system, the output of the prime mover is increased or decreased in accordance with a speed drop rate, in order to restore the changed frequency to the original one. Therefore, rotating-speed control through the rotating-speed signal when the generator is connected with the power system is excessive control, whereby power fluctuation is magnified.

By, as described in Embodiment 6, employing as a feedback signal the frequency at the terminal of the generator or at the power system, thereby suppressing excessive change in the output of the prime mover, the magnification of fluctuation in the output power of the generator can be prevented. It should be understood that, with the generator disconnected from the power system, frequency fluctuation and rotating-speed fluctuation are, as described above, equivalent to each other, the same control as those in conventional control systems can be maintained.

The configuration in FIG. 11 is obtained by, with regard to the configuration in FIG. 7, replacing the rotating-speed command value and the rotating-speed signal by the reference frequency and the frequency signal, respectively and removing the filtering device 2$b$; however, by, with regard to the configuration in FIG. 11, adding as in FIGS. 7 through 10 the filtering device 2$b$ and the phase adjustment device 8$b$, the same effect as that in Embodiment 5 can be obtained.

Embodiment 7

In Embodiment 6, a method has been described in which, as a signal for rotating-speed control, a rotating-speed signal is utilized; however, in the case of a no-load condition in which the generator is not connected with the power system, or in the case of an independent power system, the method according to Embodiment 6 is inferior to a method utilizing a rotating-speed signal, in terms of accuracy and sensitivity of the control. Embodiment 7 solves the inferiority.

Figure 13:
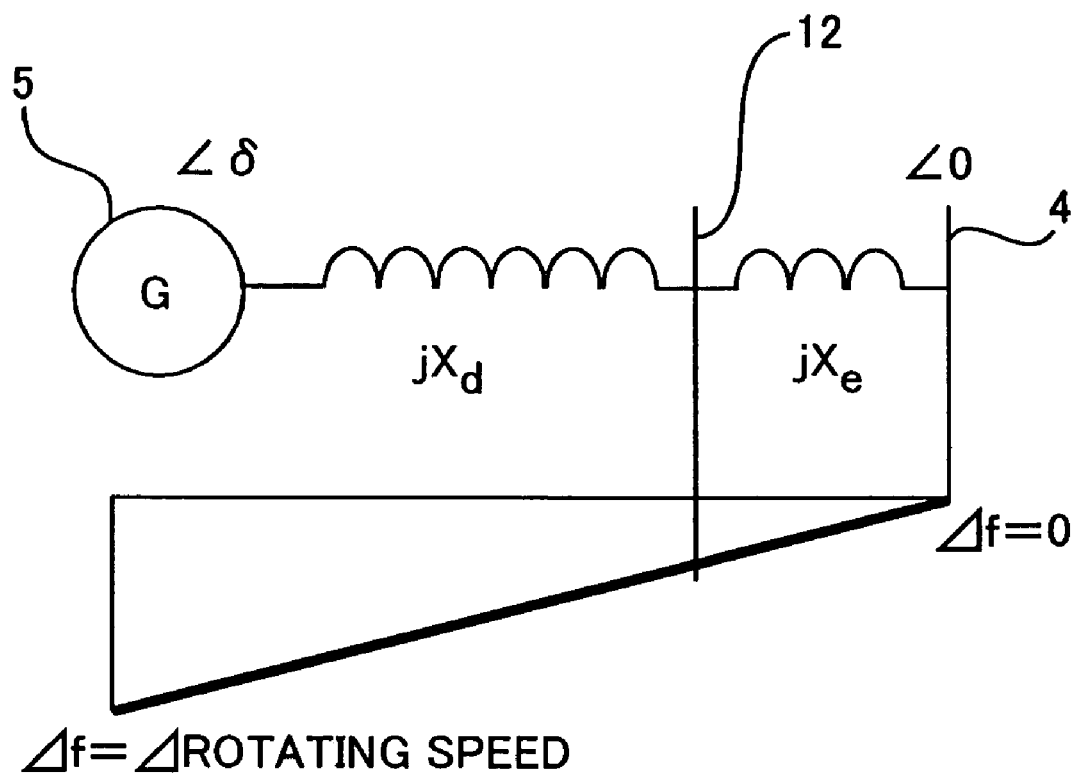
FIG. 13 is a block diagram illustrating a control method for a prime mover control system according to Embodiment 7 of the present invention.

FIG. 13 illustrates a configuration example of Embodiment 7. In FIG. 13, a switching device 11 switches between the frequency signal and the rotating-speed signal after determining, based on the input of an independent power system/no-load signal, which signal to be utilized. The independent power system/no-load signal is a status signal to be transferred from the breaker being in its operation mode and from a substation or the like in the case of an independent system; in the case of an independent power system or in the case of a no-load condition, the independent power system/no-load signal is "1", and in other cases, i.e., in the case of a normal operation condition, the independent power system/no-load signal is "0"; the switching device 11 switches inputs to the speed drop rate 10$d$ in such a way that C is A in the case where the independent power system/no-load signal is "0", and C is B in the case where the independent power system/no-load signal is "1".

With the control system being configured as described above, in the case of a normal operation in which the generator is connected with power system, a deviation signal A that is the deviation between the reference frequency and the frequency signal is selected, converted in the speed drop rate 10$d$ into the prime mover output control signal, and outputted as the control output signal; in contrast, in the case of an independent power system or in the case of a no-load condition, a deviation signal B that is the deviation between the rotating-speed command value and the rotating-speed signal is selected, converted in the speed drop rate 10$d$ into the prime mover output control signal, and outputted as the control output signal; therefore, in both cases, rotating-speed fluctuation can be suppressed with high accuracy and sensitivity.

In addition, in FIG. 13, an example has been illustrated in which the switching device 11 is arranged before the speed drop rate 10$d$; however, by employing a configuration in which respective speed drop rate 10$d$ are provided for the frequency and the rotating-speed and the respective speed drop rates 10$d$ are switched later, or by employing a method in which setting values for the speed drop rate are switched concurrently with the switching of the signals, the same effect can be obtained. Moreover, because the frequency and the rotating-speed are each compared with their reference values, a configuration may be employed in which, without providing the separated deviation detection devices, the frequency and the rotating-speed are switched before the deviation detection device.

In addition, in FIG. 13, a configuration has been illustrated in which, as a signal for switching the control signals, an operation status signal, such as an operation status of the breaker, is employed; however, by utilizing the characteristics that, as described above, in the case where the generator is connected with the power system, a large difference between the rotating-speed and the frequency at the terminal of the generator or at the power system occurs, but in the case of a no-load condition or in the case of the independent power system, the difference becomes small, and by providing a circuit that determines that, when the difference between the frequency and the rotating-speed becomes small, the generator is in a no-load condition, or in an independent-power-system condition, the control signals may be switched by a signal derived from the determination.

Moreover, in FIG. 13, a configuration has been explained in which a filter and the like are not provided; however, the switching device 11 can be applied to FIGS. 7 through 10 in Embodiments 5. Therefore, with a configuration in which a filter, a phase adjustment device, or a change detection device and a phase adjustment device are utilized, it is also possible that, in stead of control based only on the rotating-speed, the control is implemented in which, based on the operation status, the rotating-speed signal and the frequency signal are switchably utilized.

Embodiment 8

In Embodiment 7, a method has been described in which the rotating-speed signal and the frequency signal are switched in accordance with a operation status; however, in this case, two detection units, i.e., a rotating-speed detection unit and a frequency detection unit are required to be provided.

Figure 12:
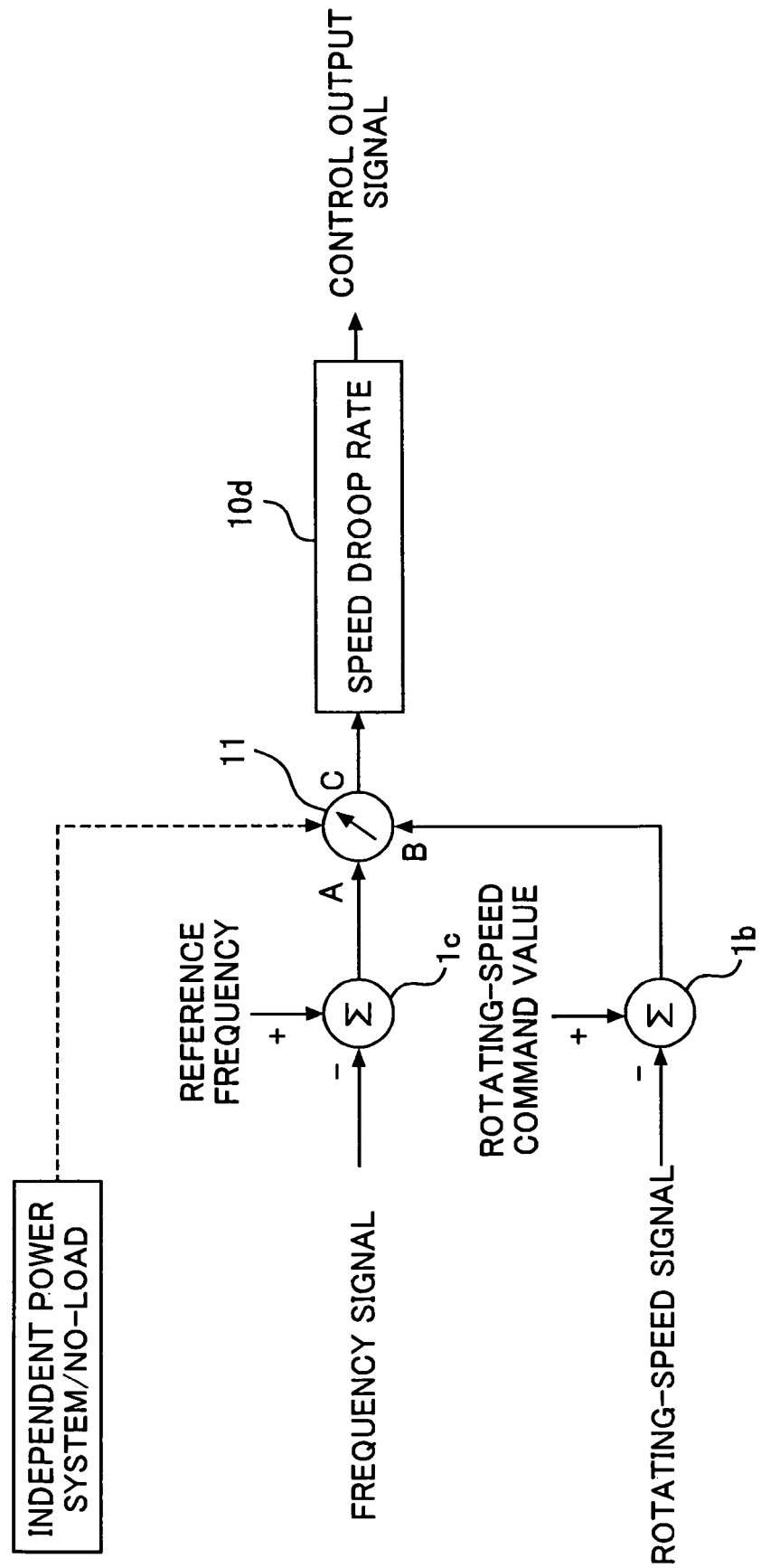
FIG. 12 is a diagram illustrating a relationship between the rotating-speed and the frequency in a single machine infinite bus system.

Meanwhile, as illustrated in FIG. 12, the relationship between rotating-speed fluctuation and frequency fluctuation at an arbitrary point is determined by the reactance X corresponding to the distance of the arbitrary point; in the case of the terminal of the generator, the rotating-speed fluctuation can be converted into a level equivalent to that of the frequency signal at a terminal 12 of the generator, by multiplying the rotating-speed fluctuation by $X_e/(X_d+X_e)$ (referred to as a sensitivity adjustment ratio, hereinafter).

Figure 14:
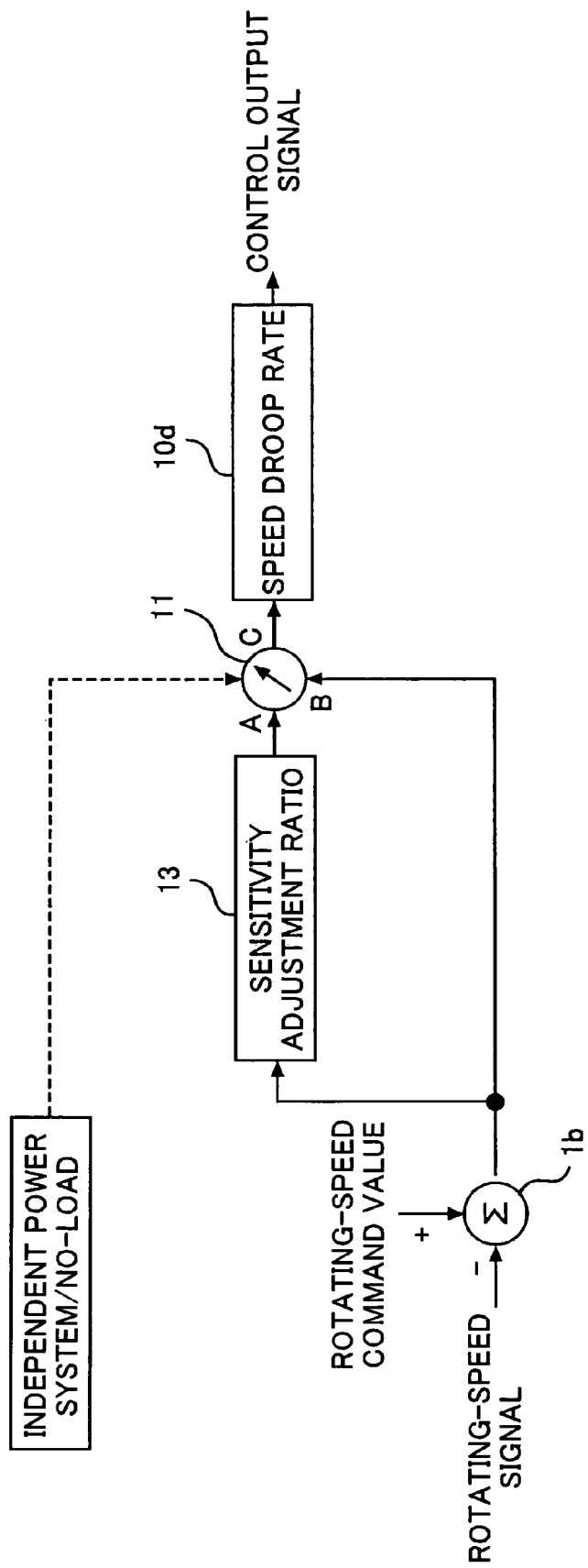
FIG. 14 is a block diagram illustrating a control method for a prime mover control system according to Embodiment 8 of the present invention.

Embodiment 8 is enabled to demonstrate the same effect as that in FIG. 7, through the foregoing principle and with a single detector; FIG. 14 illustrates a configuration example of Embodiment 8. In FIG. 14, the rotating-speed signal is converted, through a sensitivity adjustment rate 13 as a conversion device, into frequency fluctuation sensitivity at a point the power fluctuation at which is requested to be suppressed.

By configuring the control system in such a way as described above, also in a single-input-signal control system utilizing as an input signal only the rotating-speed signal, control in accordance with an operation condition can be realized, by selecting through the switching device 11 the input of the speed drop rate 10*d* in such a way that, as is the case with Embodiment 7, C is A in the case where the independent power system/no-load signal is "0", and C is B in the case where the independent power system/no-load signal is "1".

In addition, by switching the speed drop rates 10*d* between a conventional speed drop rate and a speed drop rate compensated through the sensitivity adjustment rate, the same effect can be obtained.

As is the case with Embodiment 7, a configuration in which, by employing the switching device 11, the rotating-speed signal in Embodiment 8 and a signal obtained by converting the rotating-speed signal into frequency-fluctuation sensitivity are switched in accordance with operation status can also be applied to the configurations in FIGS. 7 through 10 in Embodiment 5.

Embodiment 9

With regard to a prime mover control system that carries out control so that the output-power of a generator is equal to an electric-power command value, in Embodiments 1 through 4, a fact has been described that, in the case where the prime mover carries out the control in response to fluctuation of the output power of the generator, the fluctuation of the output power of the generator may be magnified, depending on the timing of the output from the prime mover, and methods of suppressing the magnification of fluctuation have been described.

As illustrated in FIG. 2, in the steady state, the output of the prime mover and the output power of the generator are equal; however, in a fluctuating condition, they are not equal. In other words, because the prime mover carries out the control by utilizing as a feedback signal the output power of the generator that is different from the output of the prime mover, the prime mover may respond to fluctuation, which is, in terms of genuine output-power control by the prime mover, not required to be responded, to change the output of the prime mover, thereby magnifying the fluctuation of the output power of the generator.

Embodiment 9 relates to a method in which, by obtaining through computation a signal having a nature similar to the output of the prime mover and employing the signal as a feedback signal, thereby suppressing unnecessary response by the prime mover control system, the magnification of fluctuation in the output power of the generator can be prevented.

Figure 15:
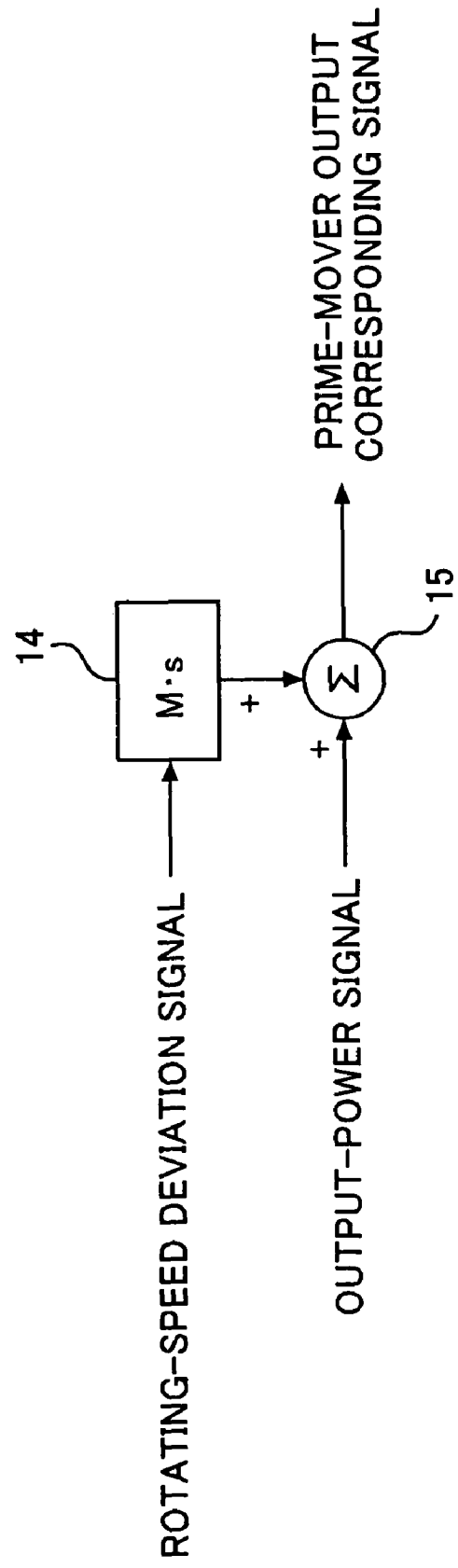
FIG. 15 is a block diagram illustrating a computing method for a feedback signal, according to Embodiment 9 of the present invention.

FIG. 15 is a block diagram illustrating an example of a computing method for a feedback signal. In FIG. 15, a rotating-speed deviation signal that represents the deviation between the rated rotating-speed and an actual rotating-speed, of the generator, is inputted to a differentiation device 14, the output-power signal from the generator and the output of the differentiation device 14 are added up in an addition device 15, and a prime mover output corresponding signal is outputted that is employed for controlling the output of the prime mover.

It assumed that fluctuation in the rotating-speed is minute and the generator and the prime mover are operated approximately at the rated $$P_m = P_e + \Delta\omega \cdot M \cdot s \qquad \text{Eq.3}$$

rotating-speed; in Equation 2, the output torque $T_m$ of the prime mover is equal to the output $P_m$ of the prime mover, and the output torque $T_e$ of the generator is equal to the output power $P_e$ of the generator; therefore, the output of the prime mover is given by Equation 3:

FIG. 15 is a block diagram illustrating the concept of Equation 3. In other words, when the output power $P_e$ of the generator fluctuates, the generator is accelerated or decelerated, due to the deviation between the output power $P_e$ and the output $P_m$ of the prime mover, to change its rotating-speed; therefore, by adding the fluctuation components to the output power $P_e$ of the generator, thereby obtaining through computation the output $P_m$ of the prime mover to be utilized as the prime mover output corresponding signal. Accordingly, in the case where only the output power $P_e$ of the generator changes, the prime mover output corresponding signal does not fluctuates; therefore, unnecessary response of the prime mover control system can be prevented.

In addition, the function of differentiation device 14 may be a genuine differential function or an inexact differential function; in the case of a digital control system, a method of computing the difference between the immediately previous value and the present value can demonstrate the same effect.

In Embodiment 9, a method has been described in which unnecessary fluctuation, in the output of the prime mover, that occurs when only the output power of the generator fluctuates can be avoided; however, due to inherent fluctuation in the output of the prime mover, or, e.g., due to a computing error in detecting the output power of the generator, fluctuation in the output of the prime mover may occur, and the control through that fluctuation may be implemented at the timing that results in magnification of the fluctuation in the output power of the generator.

Thus, by, also in Embodiment 9, employing the methods according to Embodiments 1 through 4, an effect can be obtained in which magnification of fluctuation in the output power of the generator is prevented.

What is claimed is:

1. A prime mover output control system comprising:
a deviation detection means for, with a rotating-speed command value signal indicating a command value that is a target for the rotating speed of a generator driven by a prime mover, and a rotating-speed signal indicating the present value of the rotating speed of the prime mover, as input, outputting a deviation signal indicating the deviation of the present value of the generator rotating speed from the command value;
a control means for, with the deviation signal as input, outputting a control output signal for controlling the output of the prime mover; and
a phase adjustment means for advancing or delaying the phase of the rotating-speed signal, the deviation signal, or the control output signal.

2. A prime mover output control system comprising:
a deviation detection means for, with an output-power command value signal indicating a command value that is a target for the output power of a generator driven by a prime mover, and an output-power signal indicating the present value of the output power, as input, for outputting a deviation signal indicating the deviation of the present value of the generator output power from the command value;
a control means for, with the deviation signal as input, outputting a control output signal for controlling the output of the prime mover;
a change detection means for, with the output-power signal as input, extracting from the output-power signal predetermined frequency components caused by periodic fluctuations in the generator output power, and outputting the extracted predetermined frequency components, the cycle fluctuation occurring due to discrepancy between the output of the prime mover and the output power;
a phase adjustment means for, with the predetermined frequency components as input, outputting a correction signal obtained from the predetermined frequency components by advancing or delaying the phase thereof; and
an addition means for adding the correction signal to the control output signal.

3. The prime mover output control system according to claim 2, wherein, in place of the output-power signal, a rotating-speed signal indicating the present value of the rotating-speed of the prime mover, or a frequency signal indicating the present value of the frequency at the output terminal of the generator driven by the prime mover, or the frequency in a power system to which the generator is connected, is utilized as input to the change detection means.

4. The prime mover output control system according to claim 2, wherein, for input to the deviation detection means, a rotating-speed signal indicating the present value of the rotating-speed of the prime mover is utilized in place of the output-power signal, and in place of the output-power command value signal, a rotating-speed command value that is a target for the rotating-speed is utilized; or
wherein, in place of the output-power signal, a frequency signal is utilized that indicates the present value of the frequency at the output terminal of a generator driven by a prime mover, or frequency in a power system to which the generator is connected, and in place of the output-power command value signal as input, a reference frequency for the power system is utilized, the reference frequency being inputted from the outside or having been stored in advance.

5. The prime mover output control system according to claim 2, wherein, in place of the output-power signal, a rotating-speed signal indicating the present value of the rotating-speed of the prime mover is utilized, and in place of the output-power command value signal, a rotating-speed command value signal that is a target for the rotating-speed is utilized; or
wherein, in place of the output-power signal, a frequency signal is utilized that indicates the present value of the frequency at the output terminal of the generator driven by the prime mover, or the frequency in a power system to which the generator is connected, and in place of the output-power command value signal as input, a reference frequency for the power system is utilized, the reference frequency being inputted from the outside or having been stored in advance.

6. A prime mover output control system comprising:
a first switching means for, with a signal, as input, that indicates whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it has been determined that the connection does not exist;
a first deviation detection means for, with the signal that has been selected by the first switching means as an input, outputting a first deviation signal indicating the deviation of the input signal from the rotating-speed reference value or the frequency reference value;
a second deviation detection means for, with the frequency signal as input, outputting a second deviation signal indicating the deviation of the frequency signal from a reference frequency value that is inputted from the outside or has been stored in advance; and
a first control means for, with the first deviation signal as input, outputting a first control output signal for controlling the output of the prime mover.

7. The prime mover output control system according to claim 6,
wherein, when it is determined that the connection of the generator with the power system exists, the first switching means selects the second deviation signal, and, when it is determined that the connection does not exist, selects the first deviation signal.

8. The prime mover output control system according to claim 6, further comprising a filtering means for, in any one of signals created in the process from the input of the rotating-speed signal, or the frequency signal, to the output of the control output signal, attenuating or eliminating predetermined frequency components caused by periodic fluctuations, in the output power of the generator, that occur due to discrepancy between the output of the prime mover and the generator output power.

9. The prime mover output control system according to claim 6, further comprising a phase adjustment means for advancing or delaying the phase of any one of signals created in the process from the input of the rotating-speed signal, or the frequency signal, to the output of the control output signal.

10. The prime mover output control system according to claim 7, further comprising a filtering means for, in any one of signals created in the process from the input of the rotating-speed signal, or the frequency signal, to the output of the control output signal, attenuating or eliminating predetermined frequency components caused by periodic fluctuations, in the output power of the generator, that occur due to discrepancy between the output of the prime mover and the generator output power.

11. The prime mover output control system according to claim 7, further comprising a phase adjustment means for advancing or delaying the phase of any one of signals created in the process from the input of the rotating-speed signal, or the frequency signal, to the output of the control output signal.

12. The prime mover output control system according to claim 7, further comprising:
a second switching means for, with as input a signal indicating whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it is determined that the connection does not exist;
a change detection means for, with the signal that has been selected by the second switching means as input, extracting from the output-power signal predetermined frequency components caused by periodic fluctuations in the output power of the generator, and outputting the extracted predetermined frequency components, the cycle fluctuation occurring due to discrepancy between the output of the prime mover and the output power of the generator;

a phase adjustment means for, with the predetermined frequency components as input, outputting a correction signal obtained from the predetermined frequency components by advancing or delaying the phase thereof; and an addition means for adding the correction signal to the control output signal.

13. A prime mover output control system comprising:

a first switching means for, with a signal, as input, that indicates whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it has been determined that the connection does not exist;

a first deviation detection means for, with the signal that has been selected by the first switching means as an input, outputting a first deviation signal indicating the deviation of the input signal from the rotating-speed reference value or the frequency reference value;

a first control means for, with the first deviation signal as input, outputting a first control output signal for controlling the output of the prime mover;

a second deviation detection means for, with a frequency signal as input, outputting a second deviation signal indicating the deviation of the frequency signal from a reference frequency value that is inputted from the outside or has been stored in advance; and a second control means for, with the second deviation signal as input, outputting a second control output signal for controlling the output of the prime mover, wherein, the first switching means provides a control output signal by selecting the second deviation signal if it is determined that the connection of the generator with the power system exists, and the first control output signal if it is determined that the connection does not exist.

14. The prime mover output control system according to claim 13, further comprising a filtering means for, in any one of signals created in the process from the input of the rotating-speed signal, or the frequency signal, to the output of the control output signal, attenuating or eliminating predetermined frequency components caused by periodic fluctuations, in the output power of the generator, that occur due to discrepancy between the output of the prime mover and the generator output power.

15. The prime mover output control system according to claim 13, further comprising a phase adjustment means for advancing or delaying the phase of any one of signals created in the process from the input of the rotating-speed signal, or the frequency signal, to the output of the control output signal.

16. The prime mover output control system according to claim 13, further comprising:

a second switching means for, with as input a signal indicating whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it is determined that the connection does not exist;

a change detection means for, with the signal that has been selected by the second switching means as input, extracting from the output-power signal predetermined frequency components caused by periodic fluctuations in the output power of the generator, and outputting the extracted predetermined frequency components, the cycle fluctuation occurring due to discrepancy between the output of the prime mover and the output power of the generator;

a phase adjustment means for, with the predetermined frequency components as input, outputting a correction signal obtained from the predetermined frequency components by advancing or delaying the phase thereof; and an addition means for adding the correction signal to the control output signal.

17. A prime mover output control system comprising:

a conversion means for outputting an equivalent signal obtained by converting a rotating-speed signal indicating the present value of the rotating-speed of a prime mover, which drives a generator, to be equivalent to the frequency of a power system with which the generator is connected;

a first switching means for, with a signal, as input, that indicates whether or not connection of the generator with the power system exists, selecting the equivalent signal if it is determined that the connection exists, and the rotating-speed signal if it is determined that the connection does not exist;

a deviation detection means for, with the signal that has been selected by the first switching means as input, outputting a deviation signal indicating the deviation of the input signal from the rotating-speed reference value or the frequency of the power system; and a control means for, with the deviation signal that is outputted by the deviation detection means as input, outputting a control output signal for controlling the output of the prime mover.

18. The prime mover output control system according to claim 17, further comprising a filtering means for, in any one of signals created in the process from the input of the rotating-speed signal, or the frequency signal, to the output of the control output signal, attenuating or eliminating predetermined frequency components caused by periodic fluctuations, in the output power of the generator, that occur due to discrepancy between the output of the prime mover and the generator output power.

19. The prime mover output control system according to claim 17, further comprising a phase adjustment means for advancing or delaying the phase of any one of signals created in the process from the input of the rotating-speed signal, or the frequency signal, to the output of the control output signal.

20. The prime mover output control system according to claim 17, further comprising:

a second switching means for, with as input a signal indicating whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it is determined that the connection does not exist;

a change detection means for, with the signal that has been selected by the second switching means as input, extracting from the output-power signal predetermined frequency components caused by periodic fluctuations in the output power of the generator, and outputting the extracted predetermined frequency components, the cycle fluctuation occurring due to discrepancy between the output of the prime mover and the output power of the generator;

a phase adjustment means for, with the predetermined frequency components as input, outputting a correction signal obtained from the predetermined frequency components by advancing or delaying the phase thereof; and an addition means for adding the correction signal to the control output signal.

21. A prime mover output control system comprising:

a deviation detection means for, with a rotating-speed signal indicating the present value of the rotating-speed of a prime mover as input, outputting a deviation signal indicating the deviation of the rotating-speed signal from a reference rotating-speed value that is inputted from the outside or has been stored in advance;

a conversion means for outputting an equivalent signal obtained by converting the deviation signal to be equivalent to the deviation of a frequency signal indicating the present value of the frequency of the power system from a reference frequency of a power system with which the generator is connected;

a first switching means for, with a signal indicating whether or not connection of a generator with the power system exists as input, selecting the equivalent signal if it is determined that the connection exists, and the deviation signal if it is determined that the connection does not exist; and a control means for, with the signal that has been selected by the first switching means as input, outputting a control output signal for controlling the output of the prime mover.

22. The prime mover output control system according to claim 21, further comprising a filtering means for, in any one of signals created in the process from the input of the rotating-speed signal, or the frequency signal, to the output of the control output signal, attenuating or eliminating predetermined frequency components caused by periodic fluctuations, in the output power of the generator, that occur due to discrepancy between the output of the prime mover and the generator output power.

23. The prime mover output control system according to claim 21, further comprising a phase adjustment means for advancing or delaying the phase of any one of signals created in the process from the input of the rotating-speed signal, or the frequency signal, to the output of the control output signal.

24. The prime mover output control system according to claim 21, further comprising:

a second switching means for, with as input a signal indicating whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it is determined that the connection does not exist;

a change detection means for, with the signal that has been selected by the second switching means as input, extracting from the output-power signal predetermined frequency components caused by periodic fluctuations in the output power of the generator, and outputting the extracted predetermined frequency components, the cycle fluctuation occurring due to discrepancy between the output of the prime mover and the output power of the generator;

a phase adjustment means for, with the predetermined frequency components as input, outputting a correction signal obtained from the predetermined frequency components by advancing or delaying the phase thereof; and an addition means for adding the correction signal to the control output signal.

25. A prime mover output control system comprising:

a first switching means for, with a signal, as input, that indicates whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it has been determined that the connection does not exist;

a first deviation detection means for, with the signal that has been selected by the first switching means as an input, outputting a first deviation signal indicating the deviation of the input signal from the rotating-speed reference value or the frequency reference value;

a first control means for, with the first deviation signal as input, outputting a first control output signal for controlling the output of the prime mover;

a second switching means for, with as input a signal indicating whether or not connection of a generator driven by a prime mover with a power system is implemented, selecting a frequency signal indicating the present value of the frequency at the output terminal of the generator, or the frequency in a power system if it is determined that the connection exists, and selecting a rotating-speed signal indicating the present value of the rotating-speed of the prime mover if it is determined that the connection does not exist;

a change detection means for, with the signal that has been selected by the second switching means as input, extracting from the output-power signal predetermined frequency components caused by periodic fluctuations in the output power of the generator, and outputting the extracted predetermined frequency components, the cycle fluctuation occurring due to discrepancy between the output of the prime mover and the output power of the generator;

a phase adjustment means for, with the predetermined frequency components as input, outputting a correction signal obtained from the predetermined frequency components by advancing or delaying the phase thereof; and an addition means for adding the correction signal to the control output signal.

26. A prime mover output control system comprising:

a differentiation means for computing a compensation signal by differentiating the product of the deviation between the rated rotating-speed and an actual rotating speed by the inertial constant of a rotating part of a prime mover and a generator, and outputting the compensation signal;

an addition means for adding the compensation signal to an output-power signal indicating the present value of the output power and outputting a prime mover output corresponding signal;

a deviation detection means for, with an output-power command value signal indicating a command value that is a target for the output power, and the prime mover output corresponding signal as inputs, outputting a deviation signal indicating the deviation of the present value of the output of the prime mover from the command value and;

a control means for, with the deviation signal as input, outputting a control output signal for controlling the output of the prime mover.

27. The prime mover output control system according to claim 26, further comprising a filtering means for attenuating or eliminating predetermined frequency components in the prime mover output corresponding signal, the deviation signal, or the control output signal.

28. The prime mover output control system according to claim 26, further comprising a phase adjustment means for advancing or delaying the phase of the prime mover output corresponding signal, the deviation signal, or the control output signal.

29. The prime mover output control system according to claim 26, further comprising:

a change detection means for, with the prime mover output corresponding signal as input, extracting predetermined frequency components from the input signal and outputting the extracted predetermined frequency components;

a phase adjustment means for, with the predetermined frequency components as input, outputting a correction signal obtained from the predetermined frequency components by advancing or delaying the phase thereof; and an addition means for adding the correction signal to the control output signal.

30. A prime mover output control system comprising:

a deviation detection means for, with a reference frequency value indicating a reference frequency for a power system based on a generator driven by a prime mover, and a frequency signal indicating the present value of the frequency at an output terminal of the generator driven by the prime mover, as input, outputting a deviation signal indicating the deviation of the present value of the generator frequency signal from the reference frequency value;

a control means for, with the deviation signal as input, outputting a control output signal for controlling the output of the prime mover; and a phase adjustment means for advancing or delaying the phase of the frequency signal, the deviation signal, or the control output signal, the reference frequency being inputted from the outside or having been stored in advance.

* * * * *